United States Patent [19]

Takeuchi

[11] Patent Number: 5,591,917
[45] Date of Patent: Jan. 7, 1997

[54] SEMICONDUCTOR PRESSURE SENSOR WITH RATED PRESSURE SPECIFIED FOR DESIRED ERROR OF LINEARITY

[75] Inventor: Takanobu Takeuchi, Itami, Japan

[73] Assignee: Mitsubishi Denki Kabushiki Kaisha, Tokyo, Japan

[21] Appl. No.: 530,734

[22] Filed: Sep. 19, 1995

[30] Foreign Application Priority Data

Jun. 7, 1995 [JP] Japan ................................ 7-140426

[51] Int. Cl.$^6$ ........................................ G01L 9/06
[52] U.S. Cl. ................................ 73/727; 73/721
[58] Field of Search .................... 73/727, 721; 338/42

[56] References Cited

U.S. PATENT DOCUMENTS 5,231,301  7/1993  Peterson et al. ............... 73/727 X
5,289,721  3/1994  Tanizawa et al. ............... 73/727
5,412,993  5/1995  Ohtani ........................ 73/727
5,471,086  11/1995  Ipposhi et al. ............... 73/727 X Primary Examiner—Richard Chilcot
Assistant Examiner—Joseph L. Felber

[57] ABSTRACT

A semiconductor pressure sensor of the invention comprises a silicon plate having a crystalline plane of (100) or (110), and the silicon plate comprises a diaphragm having the crystalline plane of (100) or (110), and a base surrounding said diaphragm. Further, a plurality of piezoresistor elements formed on the diaphragm. An area S (m$^2$) and a thickness t (m) of said diaphragm satisfies a following relation:

$$S/t^2 < (\epsilon/(P^{3/2}K))^{1/3},$$

where P (kPa) denotes applied pressure and $\epsilon$ (%) denotes a desired error of linearity of pressure, and $$K = 1 * 10^{-4} (kPa)^{-3/2}$$

12 Claims, 5 Drawing Sheets

1

SEMICONDUCTOR PRESSURE SENSOR WITH RATED PRESSURE SPECIFIED FOR DESIRED ERROR OF LINEARITY

BACKGROUND OF THE INVENTION

1. Field of the Invention

The present invention relates to a pressure sensor using piezoresistance of semiconductor silicon.

2. Description of the Prior Art

A pressure sensor using piezoresistance of semiconductor silicon has a gauge resistance at a thin portion (diaphragm) and detects pressure by measuring the piezoresistance thereof. The pressure sensor is used within a pressure range where a pressure against resistance characteristic is linear.

It is known that if a pressure exceeds a limit, nonlinearities due to the balloon effect of the silicon diaphragm become large and the linearity of the pressure sensor worsens. The size of the sensor's diaphragm determines an upper limit of pressure (rated pressure) beyond which the response of the sensor becomes nonlinear. Previously, the size of the diaphragm satisfying linearity of pressure up to a prescribed pressure could be determined only by producing trial products, and it is difficult to determine the size of the diaphragm.

SUMMARY OF THE INVENTION

An object of the present invention is to provide a pressure sensor satisfying pressure linearity up to a prescribed pressure value.

A semiconductor pressure sensor of the invention comprises a silicon plate having a crystalline plane of (100) or (110), and the silicon plate includes a diaphragm having the crystalline plane of (100) or (110), and a base surrounding said diaphragm. Further, a plurality of piezoresistor elements are formed on the diaphragm. An area S (m²) and a thickness t (m) of the diaphragm satisfies the following relation:

$$S/t^2 < (\epsilon/(P^{3/2}K))^{1/3},$$

where P (kPa) denotes applied pressure and ε (%) denotes a prescribed error of linearity of pressure, and $$K = 1*10^{-4}(kPa)^{-3/2}$$

A shape of the diaphragm is, for example, square or circular. For example, four piezoresistor elements form a bridge circuit, or two piezoresistor elements forms a half-bridge circuit, for precise measurement.

An advantage of the present invention is that the precision of pressure linearity can be improved.

Another advantage of the present invention is that the area and the thickness of the diaphragm can be determined according to a desired error of pressure linearity so that an appropriate chip size can be designed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

2

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

Figure 1:
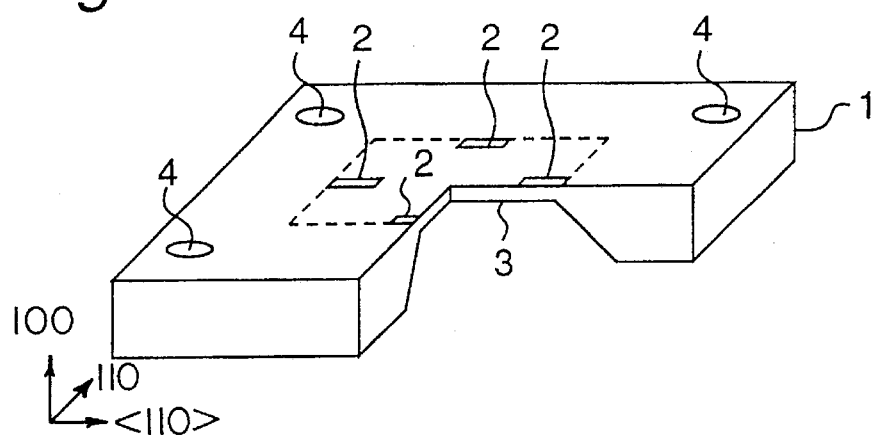
FIG. 1 is a perspective view of a semiconductor pressure sensor of a first embodiment with a portion broken away.
Figure 2:
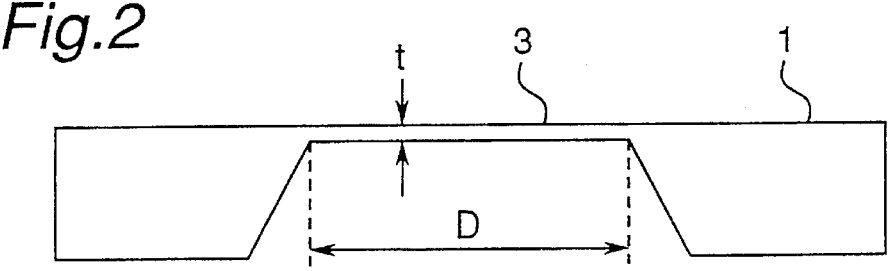
FIG. 2 is a sectional view of the sensor shown in FIG. 1.

Referring now to the drawings, wherein like reference characters designate like or corresponding parts throughout the several views, FIG. 1 shows a perspective view of a semiconductor pressure sensor of a first embodiment. A semiconductor silicon block 1 has (100) plane and a diaphragm 3 having a square shape is formed at the center thereof with etching from the rear side. Further, four gauge resistors 2 are formed as diffusion resistors on the diaphragm 3 around centers of the four sides of the square diaphragm 3 along <110> direction. The positions of the resistors are based on crystalline anisotropy of piezoresistance effect of silicon. FIG. 2 shows a section through a center of the sensor in parallel to the sides of the diaphragm 3, where thickness t and length D of a side of the diaphragm 3 are displayed. Pads 4 are formed at the four corners of the silicon block 1, and electric leads (not shown for clarity) such as metallic films are connected between the gauge resistors 2 and the pads 4 for forming a bridge circuit. In a modified example, two gauge resistors 2 and two pads 4 are formed to form a semi-bridge circuit. By using a bridge circuit or a semi-bridge circuit, pressure can be detected precisely.

Figure 3:
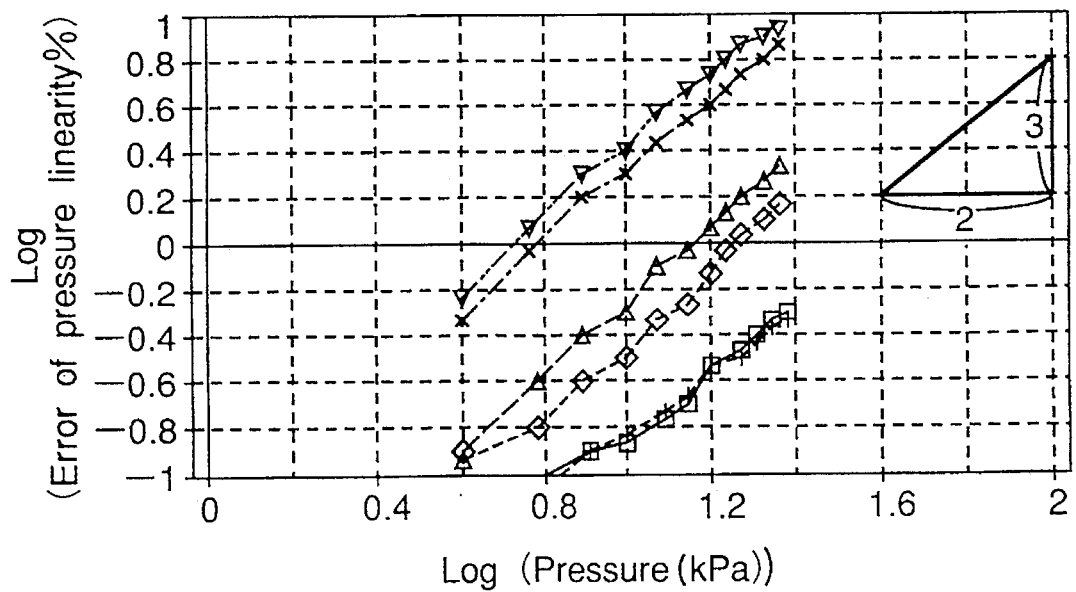
FIG. 3 is a logarithmic graph of linearity error ε (%) of pressure plotted against applied pressure P (kPa) at six sensitivities.

In order to determine a size of the diaphragm 3 satisfying an error of pressure linearity up to a guaranteed pressure, a relation for an area S and thickness t of the diaphragm to applied pressure P and error ε is derived from experimental data as follows: It is known that sensitivity of this type of semiconductor pressure sensor is proportional to $S/t^2$. Then a relation of applied pressure P to error ε of pressure linearity is determined under constant sensitivity. FIG. 3 shows a logarithmic graph of linearity error ε (% full scale) of pressure plotted against applied pressure P (kPa) at six sensitivities. The six kinds of data corresponds to sensitivities of 88.95 (▽), 81.31 (×), 55.71 (△), 49.05 (◇), 35.50 (+) and 36.33 mV/10 kPa (□) in order from above to below. FIG. 3 shows that the error $\epsilon$ of pressure linearity is proportional to the 3/2-th power of the applied pressure P.

Figure 4:
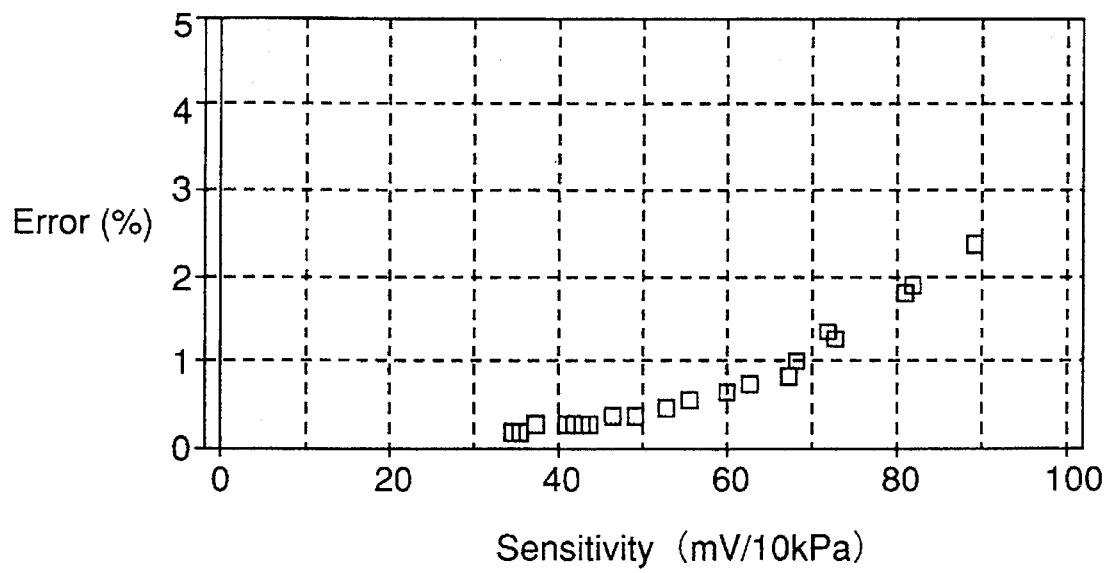
FIG. 4 is a graph of linearity error ε (%) of pressure plotted against sensitivity at 10 kPa of applied pressure.
Figure 5:
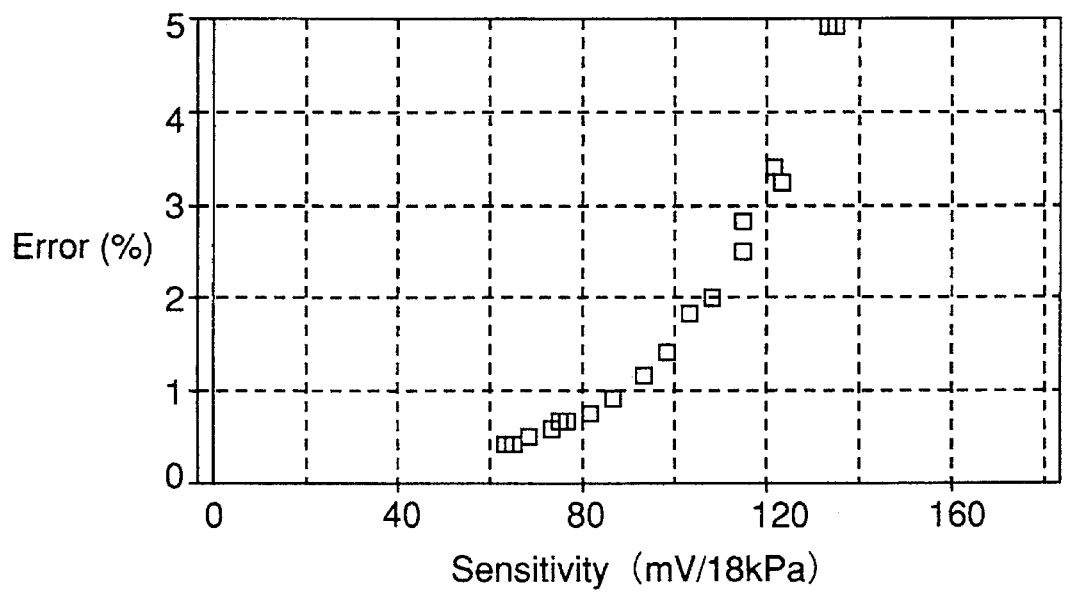
FIG. 5 is a graph of linearity error ε (%) of pressure plotted against sensitivity at 18 kPa of applied pressure.
Figure 6:
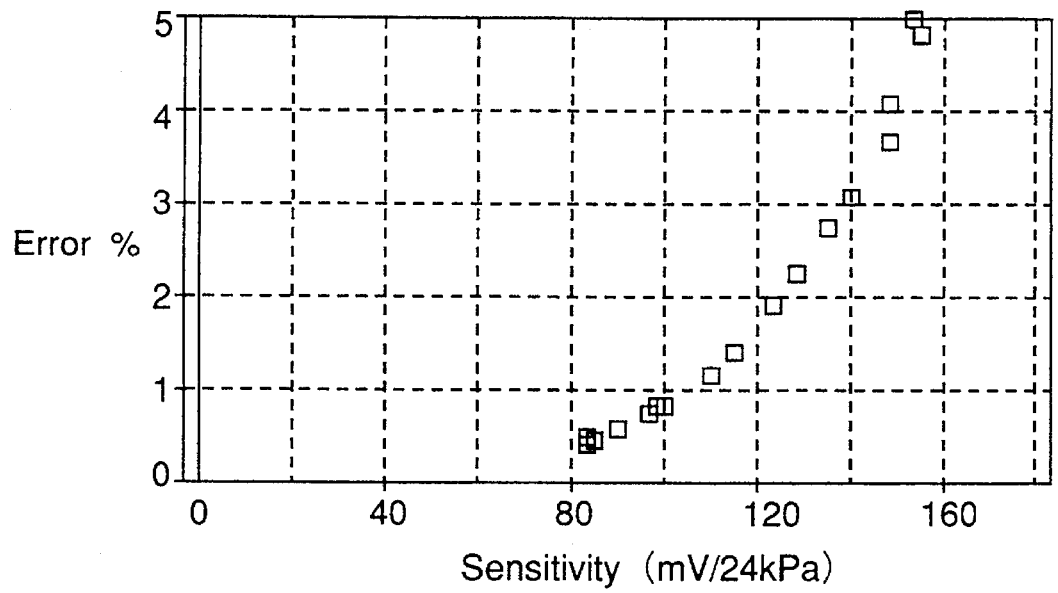
FIG. 6 is a graph of linearity error ε (%) of pressure plotted against sensitivity at 24 kPa of applied pressure.
Figure 7:
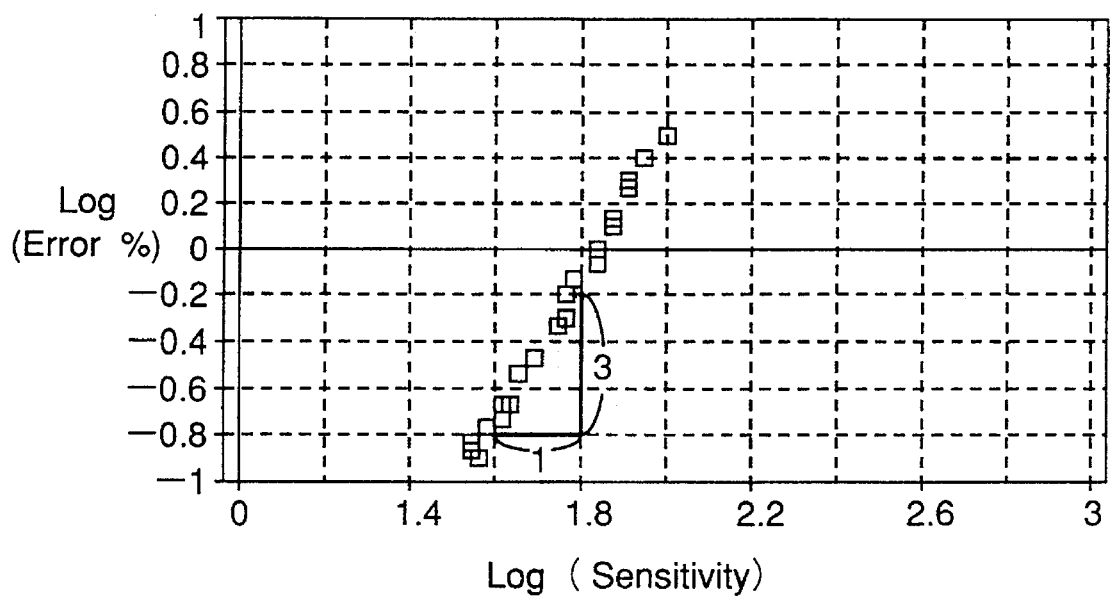
FIG. 7 is a logarithmic graph of error ε (%) of pressure linearity plotted against sensitivity at 10 kPa of applied pressure.
Figure 8:
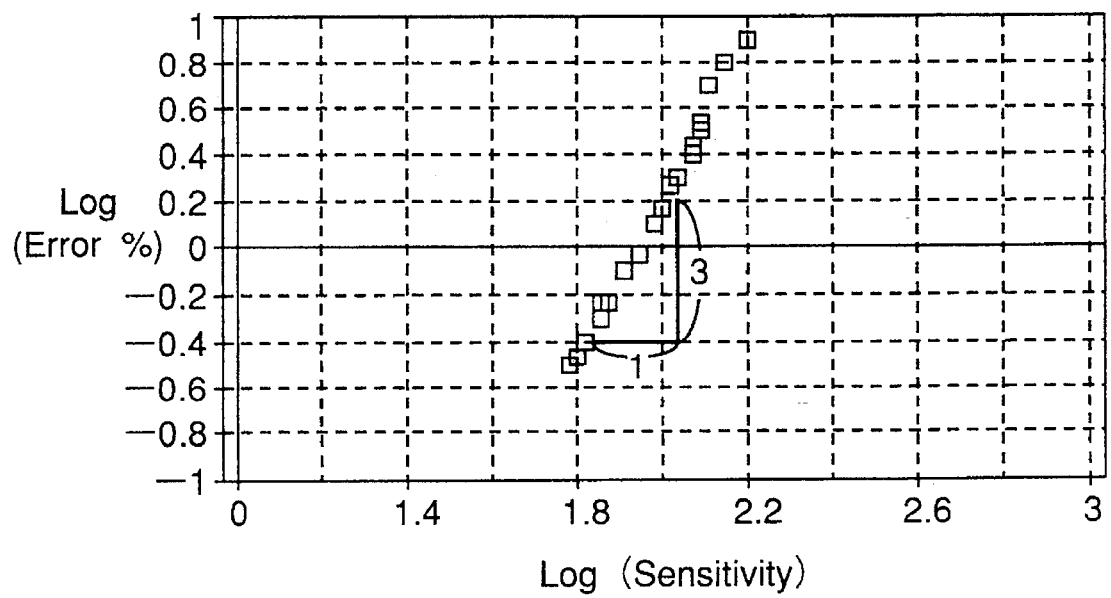
FIG. 8 is a logarithmic graph of error ε (%) of pressure linearity plotted against sensitivity at 18 kPa of applied pressure.
Figure 9:
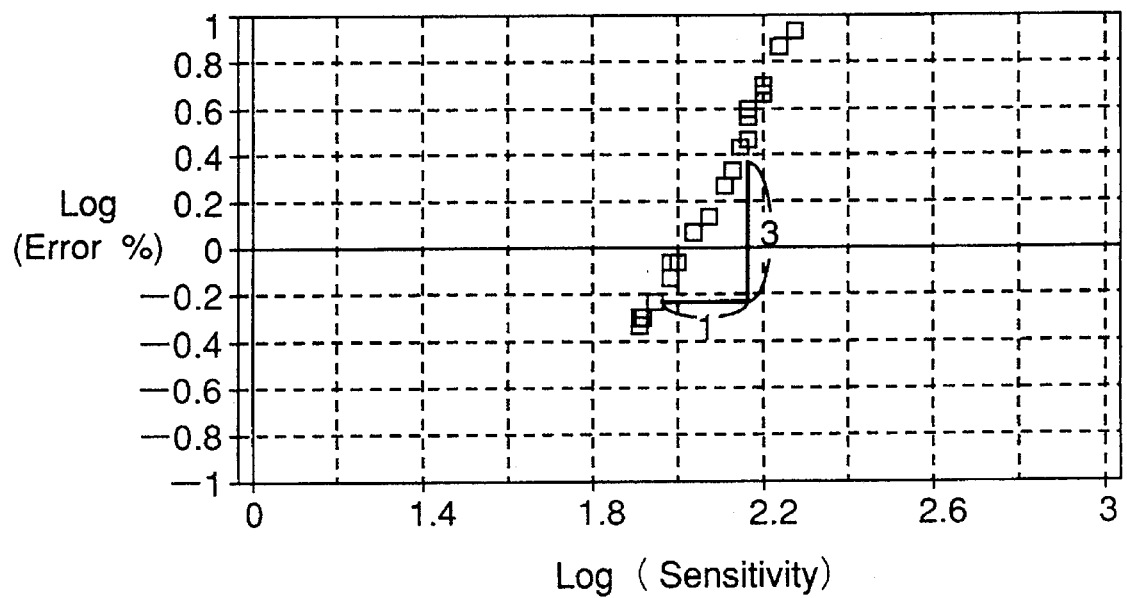
FIG. 9 is a logarithmic graph of error ε (%) of pressure linearity plotted against sensitivity at 24 kPa of applied pressure.

Next, FIGS. 4, 5 and 6 show relations of error $\epsilon$ (%) of pressure linearity plotted against sensitivity under 10, 18 and 24 kPa of constant applied pressure. Further, FIGS. 7, 8 and 9 show logarithmic plots of the error $\epsilon$ (%) of pressure linearity plotted against sensitivity at 10, 18 and 24 kPa of constant applied pressure. As shown in FIGS. 7–9, the error of pressure linearity is proportional to the third power of sensitivity. The error $\epsilon$ of pressure linearity approaches zero asymptotically as the sensitivity approaches zero.

From the above-mentioned data, it is derived that the error $\epsilon$ (%) of pressure linearity can be expressed as follows:

$$\epsilon = K(S/t^2)^3 P^{3/2}, \quad (1)$$

where S (m$^2$) and t (m) denote area and thickness of the diaphragm 3, P (kPa) denotes applied pressure, and K denotes a constant determined experimentally or $$K = 1*10^{-4}(kPa)^{-3/2} \quad (2)$$

Therefore, if the size S and t of the diaphragm is determined to satisfy the following relation and P is a pressure limit value or rated pressure above which the response of the sensor becomes substantially nonlinear:

$$\epsilon > K(S/t^2)^3 P^{3/2}, \quad (3)$$

the desired pressure linearity is guaranteed to be within the error $\epsilon$ as long as the input pressure is kept at or below P. The relation is transformed as shown below.

$$S/t^2 < (\epsilon/(P^{3/2}K))^{1/3}, \quad (4)$$

where $$K = 1*10^{-4}(kPa)^{-3/2} \quad (2)$$

A pressure sensor having a size determined as explained above has better precision of pressure linearity. Further, the area and the thickness of the diaphragm can be determined according to a desired error of pressure linearity, so that an appropriate chip size can be designed.

In the sensor shown in FIG. 1, the diaphragm 3 has a square shape. However, a similar relation is also obtained for a sensor having a diaphragm of circular shape. This is ascribed to a fact that piezoresistance characteristic of silicon is the same for applied stress. The diaphragm may have a shape such as polygon, rectangle or ellipse.

Figure 10:
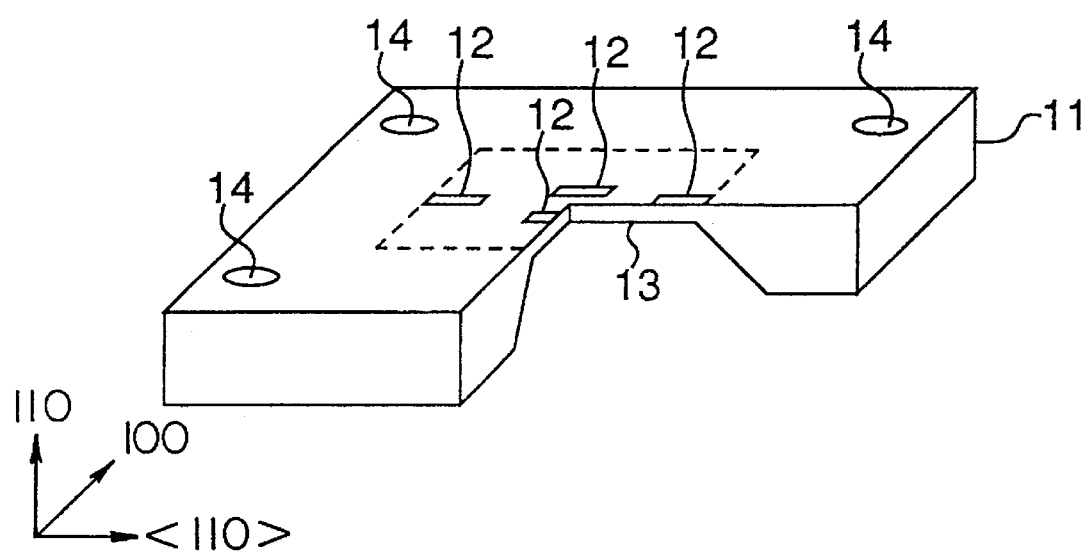
FIG. 10 is a perspective view of a semiconductor pressure sensor of a second embodiment with a portion broken away.

FIG. 10 shows a semiconductor pressure sensor of a second embodiment. A silicon block 11 has (110) plane and a diaphragm 13 having a square shape is formed at the center thereof with etching from the rear side. Further, four gauge resistors 12 are formed as diffusion resistors on the diaphragm 3 along <110> direction. Two among them are formed around centers of the four sides of the square diaphragm 3, while the other two are formed around the center of the diaphragm 3 in parallel. The positions of the resistors are based on crystalline anisotropy of piezoresistance effect of silicon on (110) plane. Pads 14 are formed at the four corners of the silicon block 11, and electric leads (not shown for clarity) such as metallic films are connected between the gauge resistors 12 and the pads 14 for forming a bridge circuit. In this type of sensor, the size of the diaphragm 13 is also required to satisfy Eq. (3) or (4) though the crystalline plane is different from that shown in FIG. 1. This is ascribed to a fact that strain of silicon against stress is the same because the sensor is also made of silicon. In a modified example, two gauge resistors 2 and two pads 4 are formed to form a semi-bridge circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A semiconductor pressure sensor comprising:

a silicon plate including a diaphragm and a base surrounding the diaphragm; and a plurality of piezoresistor elements formed on the diaphragm;

wherein an area S[(m$^2$)] and a thickness t[(m)] of said diaphragm satisfies a following relation:

$$S/t^2 < (\epsilon/P^{3/2}K))^{1/3},$$

where P denotes a rated pressure value above which the pressure sensor's response departs from the desired error of linearity $\epsilon$ and where K is a constant.

2. The semiconductor pressure sensor according to claim 1, wherein the diaphragm is square.

3. The semiconductor pressure sensor according to claim 1, wherein the diaphragm is circular.

4. The semiconductor pressure sensor according to claim 1, wherein a number of said piezoresistor elements is four, and they form a bridge circuit.

5. The semiconductor pressure sensor according to claim 1, wherein a number of said piezoresistor elements is two, and they form a half-bridge circuit.

6. The semiconductor pressure sensor of claim 1, where P is measured in kPa and K is approximately equal to $1*10^{-4}$ (kPa)$^{3/2}$.

7. A method of constructing a pressure sensor having an output response with a desired error of pressure linearity $\epsilon$ below a rated pressure value P, comprising the steps of:

providing a silicon base;

shaping the silicon base to form a diaphragm having an area S and a thickness t such that the diaphragm's dimensions substantially satisfy $S/t^2 < (\epsilon/(P^{3/2}K))^{1/3}$ where K is a constant; and forming a plurality of piezoresistor elements on the diaphragm.

8. The method of claim 7, where P is measured in kPa and K is approximately equal to $1*10^{-4}$(kPa)$^{3/2}$.

9. The method of claim 7, further comprising the step of shaping the diaphragm into a square shape.

10. The method of claim 7, further comprising the step of shaping the diaphragm into a circular shape.

11. The method of claim 7, wherein a number of the piezoresistor elements is four, the method further comprising the step of forming a bridge circuit with the four piezoresistor elements.

12. The method of claim 7, wherein a number of the piezoresistor elements is two, the method further comprising the step of forming a half-bridge circuit with the two piezoresistor elements.

* * * * *